(12) United States Patent
Schmidt

(10) Patent No.: US 12,478,274 B2
(45) Date of Patent: Nov. 25, 2025

(54) PULSE SENSOR FOR SENSING THE PULSE OF A LIVING BEING

(71) Applicant: OSRAM Opto Semiconductors GmbH, Regensburg (DE)

(72) Inventor: Tobias Schmidt, Garching (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 925 days.

(21) Appl. No.: 17/299,423

(22) PCT Filed: Dec. 2, 2019

(86) PCT No.: PCT/EP2019/083295
§ 371 (c)(1),
(2) Date: Jun. 3, 2021

(87) PCT Pub. No.: WO2020/114960
PCT Pub. Date: Jun. 11, 2020

(65) Prior Publication Data
US 2022/0047176 A1 Feb. 17, 2022

(30) Foreign Application Priority Data
Dec. 4, 2018 (DE) .......................... 102018220879.4

(51) Int. Cl.
*A61B 5/024* (2006.01)
*A61B 5/00* (2006.01)

(52) U.S. Cl.
CPC ...... *A61B 5/02427* (2013.01); *A61B 5/02438* (2013.01); *A61B 5/681* (2013.01); *A61B 2562/146* (2013.01)

(58) Field of Classification Search
CPC . A61B 5/02427; A61B 5/02438; A61B 5/681; A61B 2562/146
See application file for complete search history.

(56) References Cited

U.S. PATENT DOCUMENTS 6,088,607 A 7/2000 Diab et al.
2002/0130264 A1* 9/2002 Wichner ............... G01J 5/0815
250/353

(Continued)

FOREIGN PATENT DOCUMENTS

DE 69518434 T2 1/2001
EP 0790800 A1 8/1997

OTHER PUBLICATIONS

Wikipedia, "Principal Plane (Optics)," Sep. 20, 2019, 7 pages.
Wikipedia, "AntiReflective Coating," Sep. 20, 2019, 11 pages.

*Primary Examiner* — Justin Xu
(74) *Attorney, Agent, or Firm* — Slater Matsil, LLP

(57) ABSTRACT

In an embodiment a pulse sensor includes at least one light source configured to emit light in a direction of a blood-perfused tissue of a living being, at least one light detector including a light-sensitive surface configured to sense at least one part of a light scattered by the blood-perfused tissue, wherein the scattered light is modulated depending on a pulse of the living being and an optical concentrator arranged in a light path of the scattered light between the tissue and the light-sensitive surface of the light detector, the optical concentrator configured to concentrate the scattered light, wherein the optical concentrator has a first entry surface, through which the scattered light is able to enter the optical concentrator, and a first exit surface, through which the concentrated scattered light is able to exit from the optical concentrator toward the light-sensitive surface, the first exist surface being parallel to the first entry surface, wherein the optical concentrator is transparent to the scattered light, wherein the first entry surface is larger than the first exit surface and is larger than the light-sensitive surface of the light detector, wherein the optical concentrator is in optical contact with the light detector via the first exit surface, and wherein a sectional surface of the optical (Continued)

concentrator, perpendicular to the first entry surface and the first exit surface, is shaped trapezoidal.

14 Claims, 4 Drawing Sheets

(56) References Cited

U.S. PATENT DOCUMENTS

| | | | |
|---|---|---|---|
| 2014/0107495 A1* | 4/2014 | Marinelli | A61B 5/02438 600/476 |
| 2015/0031967 A1 | 1/2015 | LeBoeuf et al. | |
| 2016/0029911 A1* | 2/2016 | Lee | A61B 5/02427 600/407 |
| 2016/0058309 A1* | 3/2016 | Han | A61B 5/7264 600/479 |
| 2016/0240721 A1* | 8/2016 | Chu | H01L 31/02325 |
| 2017/0179682 A1* | 6/2017 | Ishii | A61B 5/1455 |
| 2017/0202514 A1 | 7/2017 | Nousiainen et al. | |
| 2018/0024056 A1* | 1/2018 | Kim | A61B 5/681 356/434 |
| 2019/0117140 A1* | 4/2019 | Al-Ali | A61B 5/02416 |
| 2020/0168757 A1* | 5/2020 | Lin | H01L 31/167 |

* cited by examiner

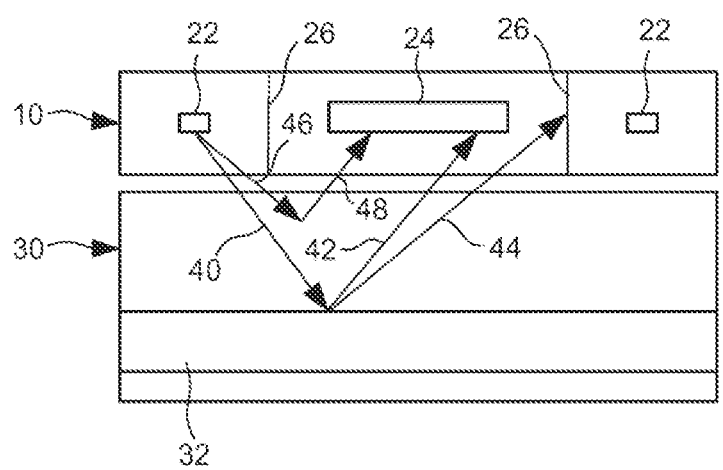
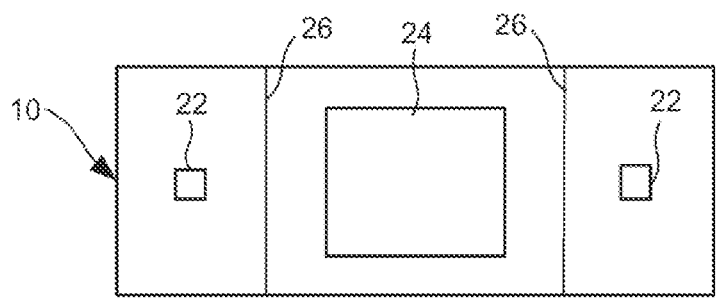
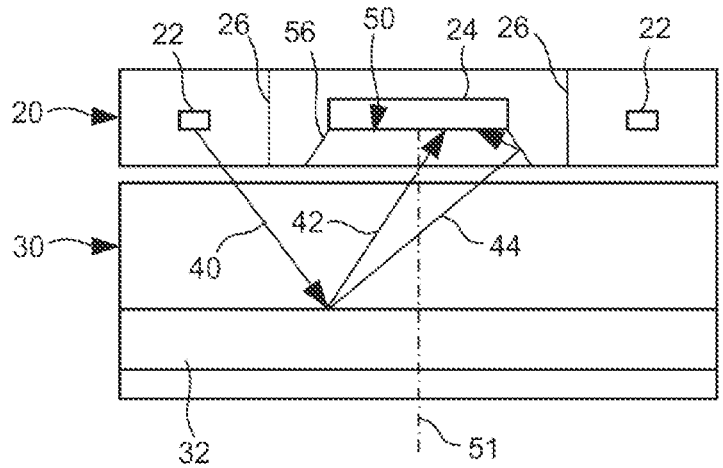

PULSE SENSOR FOR SENSING THE PULSE OF A LIVING BEING

This patent application is a national phase filing under section 371 of PCT/EP2019/083295, filed Dec. 2, 2019, which claims the priority of German patent application 10 2018 220 879.4, filed Dec. 4, 2018, each of which is incorporated herein by reference in its entirety.

TECHNICAL FIELD

The invention relates to a pulse sensor for sensing the pulse of a living being.

BACKGROUND

In recent years, pulse sensors, in other words heart rate monitors, have become more and more popular. In particular, there is an uninterrupted boom in so-called fitness trackers, which are generally a digital wristwatch having installed pulse meter.

In these pulse sensors, light, which is typically generated by means of one or more LEDs, is coupled via the surface of the skin into the tissue of a human, wherein the skin is to be understood as part of the tissue in this patent application. The light is scattered by the tissue and experiences a modulation that corresponds to the pulse of the corresponding human. The origin of this modulation has presently not yet been definitively explained, but it is suspected that the modulation is because of a density of the tissue changing due to the heartbeat around a blood vessel and/or the amount of blood varying depending on the heartbeat within a specific tissue. At least a part of the scattered and correspondingly modulated light is sensed by means of a light detector and the pulse of the corresponding human is ascertained on the basis of the modulation of the light.

One problem of these pulse sensors is that only a small component of the generated light arrives at the light detector. The remainder of the light either does not enter the tissue at all or is not scattered by the tissue in the direction toward the light detector. The ratio of the light which is sensed to the light which is generated is thus low. This ratio is also expressed as the efficiency of the pulse sensor. The efficiency of conventional pulse sensors is thus low.

A further problem is that only a part of the light which arrives at the light detector was scattered in such a way that it has the modulation corresponding to the pulse. This part of the light is scattered, for example, in a blood vessel of the tissue or close to a blood vessel of the tissue. The remainder of the light is scattered in regions of the tissue which do not have a modulating effect on the light in accordance with the pulse. This part of the light is scattered remotely from the blood vessel, for example. For example, blood vessels are generally at least 1 mm to 2 mm, sometimes up to 5 mm or more below the skin surface, because of which light that is already scattered in upper skin layers does not experience modulation, which can be evaluated, due to the pulse. The ratio of modulated light which is sensed to unmodulated light which is sensed is thus also low. This ratio can be expressed as the ratio R. The ratio R is thus low in the conventional pulse sensors.

The low efficiency and the low ratio R have the result that the signal generated by means of the light detector is relatively weak and has a relatively poor signal-to-noise ratio.

The efficiency and the ratio R can be influenced by simple measures, which are at least partially contrary, however. I.e., there are measures which improve the efficiency and simultaneously worsen the ratio R and vice versa. For example, if one increases the distance between the LEDs and the light detector and/or widens partition walls between the LEDs and the light detector, the path which the light has to cover from the LEDs to the light detector becomes longer. This has the result that the light is scattered more often and the efficiency sinks. However, the probability that the light penetrates deeper into the tissue increases simultaneously. This has the result that a larger component of the scattered light experiences the desired modulation upon the scattering, which increases the ratio R. Effects contrary to these effects occur if the distance between the LEDs and the light detector is reduced.

In addition, it is necessary for most applications, for example for wristwatches, that the corresponding pulse sensor is particularly thin.

FIG. 1 shows a conventional pulse sensor 10. The conventional pulse sensor 10 includes at least one light source 22, in the example shown two light sources 22 and at least one light detector 24. The light sources 22 and the light detector 24 are arranged in a housing of the conventional pulse sensor 10. Within the housing, the light sources 22 are separated by partition walls 26 from the light detector 24, so that light generated by means of the light sources 22 cannot reach the light detector 24 on a direct path. The housing and the partition walls 26 form three cavities, in which the two light sources 22 and the light detector 24 are accordingly arranged. The cavities can also be referred to as chambers. The cavities are open at the bottom in FIG. 1, so that the generated light can leave the pulse sensor 10 and the light to be sensed can reach the light detector 24. The cavities are frequently filled using a transparent material, for example using silicone.

The conventional pulse sensor 10 is used to sense a pulse of a living being. The living being can be, for example, a human or animal. The living being has a tissue 30, in which a blood vessel 32 extends, for example a blood vessel, an artery, or a vein.

The light generated by means of the light sources 22 can propagate, for example, along a first light path 40. The light that propagates along the first light path 40 is incident on the blood vessel 32, is scattered by the blood vessel 32, and at the same time experiences a modulation which is representative for the pulse of the living being. The modulated scattered light can propagate, for example, along a second light path 42 and is thus incident on the light detector 24, which senses the modulated scattered light. The light detector 24 generates an electrical output signal, which is representative for the sensed light, its modulation, and in particular is representative for the pulse of the living being. An evaluation unit (not shown) can receive and evaluate the output signal of the light detector 24. In particular, the evaluation unit can ascertain the pulse of the living being on the basis of the modulation of the light.

In the conventional pulse sensor 10, only a small component of the generated light reaches the light detector 24. For example, the light scattered at the blood vessel 32 can propagate along a third light path 44 and is thus incident on one of the partition walls 26 and not on the light detector 24. The efficiency of the conventional pulse sensor 10 is thus low.

It is furthermore problematic in the conventional pulse sensor 10 that only a small component of the generated light 46 is scattered by a part of the tissue 30 that modulates the light. In other words, a larger part of the generated light is scattered in regions of the tissue 30 in which it does not experience modulation due to the pulse of the living being. For example, the generated light can propagate along a fourth light path 46, can then be scattered in the tissue 30 far from the blood vessel 32, and can be incident on the light detector 24 along a fifth light path 48. This part of the light is sensed by means of the light detector 24, but does not have a modulation corresponding to the pulse of the living being and is therefore not representative for the pulse of the living being. The ratio R is therefore also low.

Since both the efficiency and also the ratios R are low in the conventional pulse sensor 10, in the conventional pulse sensor 10, overall only a very small component of the generated light is modulated corresponding to the pulse of the living being and sensed by the light detector 24.

SUMMARY

Embodiments provide a pulse sensor for sensing the pulse of a living being, which has a high efficiency, the ratio R of which is large, and which is thin.

Further embodiments provide a pulse sensor for sensing the pulse of a living being, comprising: at least one light source, which is designed and arranged so that upon intended use of the pulse sensor, it emits light in the direction of a blood-perfused tissue of the living being, wherein the blood-perfused tissue scatters the light and wherein the scattered light is modulated in dependence on the pulse of the living being; at least one light detector, which includes a light-sensitive surface, by means of which the at least one part of the light scattered by the tissue is sensed; and an optical concentrator for concentrating the scattered light, which is arranged in the light path of the scattered light between the tissue and the light-sensitive surface of the light detector, and which has a first entry surface, through which the scattered light enters the optical concentrator, which has a first exit surface, through which the concentrated scattered light exits from the optical concentrator toward the light detector, and which is transparent to the scattered light, wherein the first entry surface of the optical concentrator is larger than the first exit surface of the optical concentrator and is larger than the light-sensitive surface of the light detector, and wherein the optical concentrator is in optical contact with the light detector via the first exit surface.

The optical concentrator is used to collect the light scattered in the tissue and guide it toward the light detector. Since the first entry surface of the optical concentrator is larger than the first exit surface of the optical concentrator and is larger than the light-sensitive surface of the light detector, the optical concentrator causes a larger component of the scattered light to be incident on the light-sensitive surface of the light detector than without the optical concentrator. Speaking descriptively, the optical concentrator collects a relatively large amount of light via its relatively large first entry surface and guides it onto the light-sensitive surface of the light detector, which is relatively small in relation. In other words, the optical concentrator acts as an optical funnel, which collects light within a large surface, namely the first entry surface of the optical concentrator, and relays it to, in particular concentrates it on, a small surface, namely the light-sensitive surface of the light detector.

This has the effect that both the efficiency and also the ratio R of the pulse meter are particularly high. In addition, such an optical concentrator can be made relatively thin, so that the corresponding pulse meter can also be made particularly thin.

The light source can be an LED, for example. In addition to the one light source, the pulse meter can include one, two, or more further light sources. The light detector is, for example, a photodiode or includes, for example, a photodiode. In addition to the photodiode, the light detector can include one, two, or more further photodiodes. Moreover, the pulse meter can include a housing in which the light source and the light detector are arranged. The light source and the light detector are arranged in the housing in such a way that the light generated by means of the light source does not reach the light detector directly, thus without being incident on the tissue. For this purpose, the light source and the light detector can be arranged in one cavity or chamber of the housing in each case, wherein the one cavity is separated from the other cavity by an opaque partition wall.

The first exit surface of the optical concentrator can have, for example, the same shape and/or the same size as the light-sensitive surface of the light detector. The optical concentrator being in optical contact with the light-sensitive surface of the light detector means that the light scattered in the tissue can reach the light-sensitive surface of the light detector through the optical concentrator, and no region having an index of refraction less than 1.3 is between the optical concentrator and the light-sensitive surface of the light detector.

According to one refinement, the optical concentrator is formed in one piece. This contributes to the optical concentrator being simple to produce and easy to install, and no losses occurring within the optical concentrator due to interfaces of different elements of the optical concentrator.

According to one refinement, the optical concentrator includes at least one first side wall which connects the first entry surface to the first exit surface. In addition to the first side wall, the optical concentrator can include one, two, or more first side walls. The light guiding within the optical concentrator up to the light-sensitive surface of the light detector can take place at least partially via internal total reflection at the one or the multiple side walls of the optical concentrator.

According to one refinement, the first side wall encloses an angle greater than zero with a normal on a detector surface of the light detector. This can contribute to the first entry surface of the optical concentrator being larger than the first exit surface of the optical concentrator.

According to one refinement, the optical concentrator is made ingot-shaped. This can contribute to the first entry surface of the optical concentrator being larger than the first exit surface of the optical concentrator, the light being relayed within the optical concentrator by means of internal total reflection, and/or the optical concentrator being simple to produce. The optical concentrator being made ingot-shaped means that the first entry surface and the first exit surface are parallel to one another, and a sectional surface of the optical concentrator perpendicular to the first entry surface and the first exit surface is shaped trapezoidal.

According to one refinement, an outer surface of the first side wall is optically smooth. This contributes to a particularly high component of the light which enters via the first entry surface into the optical concentrator exiting from the first exit surface of the optical concentrator toward the light-sensitive surface of the light detector. The outer surface being optically smooth means that a surface roughness of the outer surface is small in relation to the wavelength of the light scattered in the tissue.

According to one refinement, an outside of the first entry surface is made anti-reflective. This contributes to a particularly high component of the light which is scattered by the tissue in the direction toward the optical concentrator entering the optical concentrator.

According to one refinement, the optical concentrator is fastened by means of adhesive on the light detector, wherein the adhesive is transparent to the scattered light and has the same or a higher index of refraction than the optical concentrator. This causes losses during the transition from the optical concentrator to the light detector to be particularly low.

According to one refinement, the optical concentrator includes artificial resin, silicone, glass, and/or polycarbonate or is formed therefrom. It is moreover particularly advantageous if the material used has a high index of refraction. In particular upon the use of glass, it can therefore be advantageous to use glass which has a high index of refraction. Polycarbonate, in contrast, fundamentally has a very high index of refraction for a plastic.

According to one refinement, the pulse sensor includes a diffusely reflecting surface which is arranged outside the optical concentrator and which is at least partially spaced apart from the optical concentrator, wherein a distance of the diffusely reflecting surface to the optical concentrator close to the light detector is less than a distance of the diffusely reflecting surface to the optical concentrator far from the light detector and wherein the index of refraction between the diffusely reflecting surface and the optical concentrator is approximately one or precisely one. Since the diffusely reflecting surface has a greater distance to the optical concentrator far from the light detector than close to the light detector, the diffusely reflecting surface is used for collecting light which, without the diffusely reflecting surface, would be incident neither on the optical concentrator nor on the light detector, and for coupling the corresponding light into the optical concentrator via the first side wall. Moreover, the diffusely reflecting surface can reflect light, which inadvertently exits from the optical concentrator in the direction toward the diffusely reflecting surface, back into the optical concentrator. This contributes to the ratio R and the efficiency of the pulse sensor being particularly high.

In addition to the one diffusely reflecting surface, the pulse sensor can include one, two, or more corresponding diffusely reflecting surfaces. The corresponding diffusely reflecting surfaces can be arranged jointly like an outer optical funnel around the inner optical funnel, namely the optical concentrator, and can couple light, which would not be coupled without the diffusely reflecting surfaces into the optical concentrator, into the optical concentrator. This contributes to the ratio R and the efficiency of the pulse sensor being particularly high. As already explained at the outset, the efficiency and the ratio R can be further influenced by simple measures, for example by variation of the distance between the light sources and the light detector, wherein such measures can have effects contrary to one another on the efficiency and the ratio R. The diffusely reflecting surfaces can optionally be formed as partition walls, can replace them, and can delimit the chamber in which the light detector is arranged.

According to one refinement, the reflective surface includes plastic, $TiO_2$, $Al_2O_3$, and/or barium sulfate or is formed therefrom.

According to one refinement, the pulse sensor includes an optical decoupling body for decoupling the light generated by means of the light source out of the pulse sensor, wherein the optical decoupling body: is arranged in the light path between the light source and the tissue; has a second entry surface, through which the generated light enters the optical decoupling body; has a second exit surface, through which the light is decoupled from the optical decoupling body and which is larger than the second entry surface; is transparent to the generated light; and is in optical contact with the light source via the second entry surface. The optical decoupling body is used so that a particularly large amount of the light generated by means of the light source is decoupled from the pulse sensor in the direction toward the tissue.

Descriptively speaking, the decoupling body corresponds with respect to its shape and the material used to the optical concentrator, wherein in contrast to the optical concentrator, the decoupling body is arranged at the light source and not at the light detector. The decoupling body can accordingly be formed in one piece. Furthermore, the decoupling body can include at least one second side wall which connects the second entry surface to the second exit surface. In addition to the second side wall, the decoupling body can include one, two, or more second side walls. The light guiding within the decoupling body can take place at least partially via internal total reflection at the one or the multiple second side walls of the decoupling body. The second side wall can enclose an angle greater than zero with a normal on an emission surface of the light source. The decoupling body can be formed ingot-shaped. An outer surface of the second side wall can be optically smooth. The decoupling body can be fastened by means of adhesive on the corresponding light source, wherein the adhesive is transparent to the emitted light and has the same or a higher index of refraction than the decoupling body. The decoupling body can include artificial resin, silicone, glass, and/or polycarbonate or can be formed therefrom. In addition, it is particularly advantageous if the material used has a high index of refraction. In particular upon the use of glass, it can therefore be advantageous to use glass which has a high index of refraction. In contrast, polycarbonate fundamentally has a very high index of refraction for a plastic. The decoupling body is in optical contact with the light source. This means that light generated by the light source can reach the decoupling body via the second entry surface, and no region having an index of refraction less than 1.3 is between the decoupling body and the light source.

Other embodiments are provided by a pulse sensor for sensing the pulse of a living being, comprising: at least one light source, which is designed and arranged so that in intended use of the pulse sensor, it emits light in the direction of a blood-perfused tissue of the living being, wherein the blood-perfused tissue scatters the light and wherein the scattered light is modulated in dependence on the pulse of the living being; at least one light detector, which detects at least a part of the light scattered by the tissue; and an optical decoupling body for decoupling the light generated by means of the light source from the pulse sensor, wherein the optical decoupling body is arranged in the light path between the light source and the tissue, has a second entry surface, through which the generated light enters the optical decoupling body, has a second exit surface, through which the light is decoupled from the optical decoupling body and which is larger than the second entry surface, is transparent to the generated light, and is in optical contact with the light source.

The optical decoupling body is used so that a particularly large amount of the light generated by means of the light source is decoupled from the pulse sensor in the direction toward the tissue. This has the effect that the efficiency of the pulse meter is particularly high. In addition, such a decoupling body can be made relatively thin, so that the corresponding pulse meter can also be made particularly thin.

According to one refinement, the optical decoupling body is formed in one piece. This contributes to the decoupling body being simple to produce and easy to install, and no losses occurring within the optical decoupling body due to interfaces of different elements of the decoupling body.

According to one refinement, the optical decoupling body includes at least one second side wall, which connects the second entry surface to the second exit surface and is optically smooth.

According to one refinement, the second side wall encloses an angle greater than zero with a normal on a light-emitting surface of the light source. Alternatively or additionally, the optical decoupling body is formed ingot-shaped. This can contribute to the second entry surface of the decoupling body being smaller than the second exit surface of the decoupling body, the light being relayed within the decoupling body by means of internal total reflection, and/or the decoupling body being simple to produce.

BRIEF DESCRIPTION OF THE DRAWINGS

Exemplary embodiments of the invention are illustrated in the figures and are explained in greater detail hereinafter.

FIG. 1 shows a lateral sectional illustration of a conventional pulse sensor on a tissue of a living being;

FIG. 2 shows a bottom view of the conventional pulse sensor according to FIG. 1;

FIG. 3 shows a lateral sectional illustration of an exemplary embodiment of a pulse sensor on a tissue of a living being;

Figure 4:
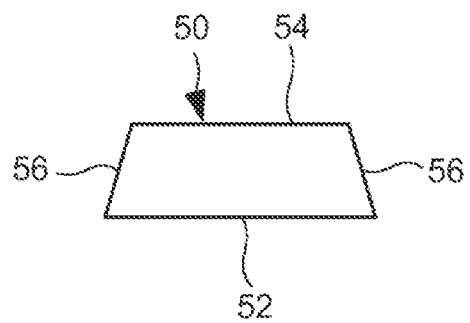
FIG. 4 shows a lateral sectional illustration of an exemplary embodiment of an optical concentrator.

In the following detailed description, reference is made to the appended drawings, which form part of this description and in which specific exemplary embodiments are shown for illustration, in which the invention can be embodied. Since components of exemplary embodiments can be positioned in a number of different orientations, the directional terminology is used for illustration and is in no way restrictive. It is obvious that other exemplary embodiments can be used and structural or logical modifications can be performed without deviating from the scope of protection of the present invention. It is obvious that the features of the various exemplary embodiments described herein can be combined with one another if not specifically indicated otherwise. The following detailed description is therefore not to be understood in restrictive terms, and the scope of protection of the present invention is defined by the attached claims. In the figures, identical or similar elements are provided with identical reference numerals, insofar as this is appropriate.

DETAILED DESCRIPTION OF ILLUSTRATIVE EMBODIMENTS

FIG. 1 shows a lateral sectional illustration of a conventional pulse sensor 10 on a tissue 30 of a living being. The conventional pulse sensor 10 includes at least one, in the exemplary embodiment shown two light sources 22 and a light detector 24. The light sources 22 and the light detector 24 are arranged in a housing of the conventional pulse sensor 10. The housing of the conventional pulse sensor 10 includes two partition walls 26, which divide the interior of the housing into three chambers. The chambers can also be referred to as cavities. The light detector 24 is arranged in the middle chamber and the light sources 22 are arranged in the outer chambers. The partition walls 26 are used to prevent light which is generated by means of the light sources 22 from reaching the light detector 24 directly, without previously being incident on the tissue 30.

The tissue 30 includes a blood vessel 32 which extends through the tissue 30. The blood vessel 32 can be, for example, a vein, a blood vessel, or an artery. The heart of the living being pumps blood in pulses through the blood vessel 32. The volume of the blood in the blood vessel 32 thus varies corresponding thereto in pulses. This results in a pulsed compression of the tissue 30 in the vicinity of the blood vessel 32.

The light generated by means of the light sources 22 propagates, for example, along a first light path 40. The light that propagates along the first light path 40 is incident on the blood vessel 32 and is scattered by the blood vessel 32. The light experiences a modulation during the scattering, which corresponds to the pulse of the living being. The light scattered by the blood vessel 32 thus has a modulation, on the basis of which inferences can be drawn about the pulse of the living being.

In order that the scattered light has the modulation which corresponds to the pulse of the living being, the light does not necessarily have to be scattered by the blood vessel 32 itself. The light can also be scattered inside the blood vessel or in the vicinity of the blood vessel 32 and nonetheless has the modulation which corresponds to the pulse of the living being.

The modulated scattered light can propagate, for example, along a second light path 42. The modulated scattered light which propagates along the second light path 42 is incident on a light-sensitive surface of the light detector 24. The light detector 24 senses the modulated scattered light incident thereon and generates an output signal which is representative of the modulation and thus of the pulse of the living being. The output signal is transmitted to a control unit (not shown), which ascertains the pulse of the living being on the basis of the output signal. The control unit can be arranged in the conventional pulse sensor 10 or outside the conventional pulse sensor 10.

However, the modulated scattered light can also propagate along a third light path 44. The modulated scattered light which propagates along the third light path 44 is incident on one of the partition walls 26 and is absorbed thereby. This component of the modulated scattered light is thus not sensed by the light detector 24.

The light generated by the light source 22 can propagate along a fourth light path 46 alternatively to the first light path. The light which propagates along the fourth light path 46 is scattered in the tissue far from the blood vessel 32. Due to the distance of the corresponding scattering center from the blood vessel 32, the light scattered there experiences no or only an unusable modulation, so that no inference about the pulse of the living being can be drawn on the basis of this component of the light. For example, if the non-modulated scattered light propagates along a fifth light path 48, this component of the light is incident on the light detector 24, but no inference about the pulse of the living being can be drawn on the basis of the corresponding output signal of the light detector 24.

FIG. 2 shows a bottom view of the conventional pulse sensor according to FIG. 1. It is apparent from FIG. 2 that the light sources 22 and the light detector 24 are each arranged in separate chambers of the conventional pulse sensor 10, and the chambers are open at the bottom, so that the generated light can leave the conventional pulse sensor 10 in the direction of the tissue 30, and the scattered light can reach the light detector 24.

FIG. 3 shows a lateral sectional illustration of an exemplary embodiment of a pulse sensor 20 on a tissue 30 of a living being. The tissue 30 includes the blood vessel 32 and corresponds to the tissue 30 explained above. The pulse sensor 20 substantially corresponds to the pulse sensor 20 explained above. For example, the pulse sensor 20 also includes at least one, in the exemplary embodiment shown two light sources 22 and a light detector 24. In addition, the light sources 22 and the light detector are also arranged in chambers of a housing of the pulse sensor 20 and are shaded from one another by the partition walls 26.

The pulse sensor 20 additionally includes an optical concentrator 50. The optical concentrator 50 is arranged along the second light path 42 between the tissue 30 and the light detector 24. The optical concentrator 50 is in optical contact with the light detector 24. The optical concentrator 50 can be in indirect or direct contact with the light detector 24. For example, the optical concentrator 50 can be fastened by means of an adhesive on the light-sensitive surface of the light detector 24.

The optical concentrator 50 is transparent to the scattered light. The optical concentrator 50 includes a first entry surface, which faces toward the tissue 30 and through which the light that propagates along the first light path 42 is coupled into the optical concentrator 50. The optical concentrator 50 includes a first exit surface, which faces toward the light detector 24 and from which the light coupled into the optical concentrator 50 exits toward the light-sensitive surface of the light detector 24. The first entry surface is larger than the first exit surface.

The first exit surface preferably corresponds to the light-sensitive surface of the light detector 24. For example, the first exit surface and the light-sensitive surface of the light detector 24 can be approximately equal in size, preferably precisely equal in size.

The optical concentrator includes at least one, preferably multiple first side walls 56, which connect the first entry surface to the first exit surface. The first side walls 56 of the optical concentrator are inclined with respect to a normal 51 on the light-sensitive surface of the light detector 24. The optical concentrator 50 can be made ingot-shaped, for example. The optical concentrator can include, for example, artificial resin, silicone, glass, and/or polycarbonate or can be formed therefrom. The material used preferably has a high index of refraction. In particular upon the use of glass for the optical concentrator 50, it is advantageous to use glass which has a high index of refraction. In contrast, polycarbonate fundamentally has a very high index of refraction for a plastic.

The first side walls 56 of the optical concentrator 50 border air or another medium having a low index of refraction, for example, an index of refraction of approximately one or precisely one, so that the internal total reflection takes place at the first side walls 56. In other words, air or another material having a low index of refraction is located between the partition walls 26 and the optical concentrator 56.

The optical concentrator 50 acts like an optical funnel which guides the light incident thereon toward the light detector 24. Since the first entry surface is larger than the first exit surface, more light is collected by means of the optical concentrator 50 and guided to the light detector 24 than would reach the light detector 24 without the optical concentrator 50. For example, the modulated scattered light which propagates along the third light path 44 is internally totally reflected from one of the first side walls 56 of the optical concentrator 50 toward the light-sensitive surface of the light detector 24. This component of the modulated scattered light can now be sensed and used to ascertain the pulse of the living being. More scattered light thus reaches the light detector 24 by means of the optical concentrator 50 than without the optical concentrator 50. This has the effect that the efficiency of the pulse sensor 20 is particularly high.

FIG. 4 shows a lateral sectional illustration of an exemplary embodiment of an optical concentrator 50. The optical concentrator 50 can correspond, for example, to the optical concentrator 50 explained with reference to FIG. 3.

Figure 5:
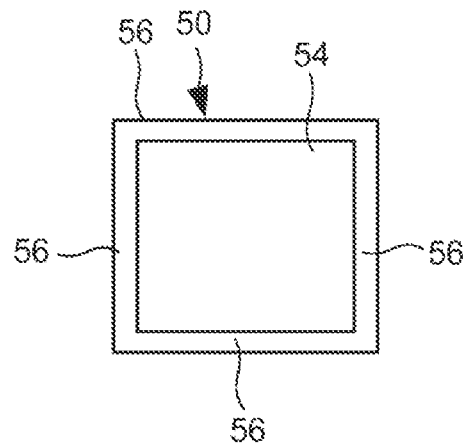
FIG. 5 shows a top view of the optical concentrator according to FIG. 4.

FIG. 5 shows a top view of the optical concentrator according to FIG. 4. It is apparent from FIG. 5 that the optical concentrator 50 used in this exemplary embodiment is made ingot-shaped.

Figure 6:
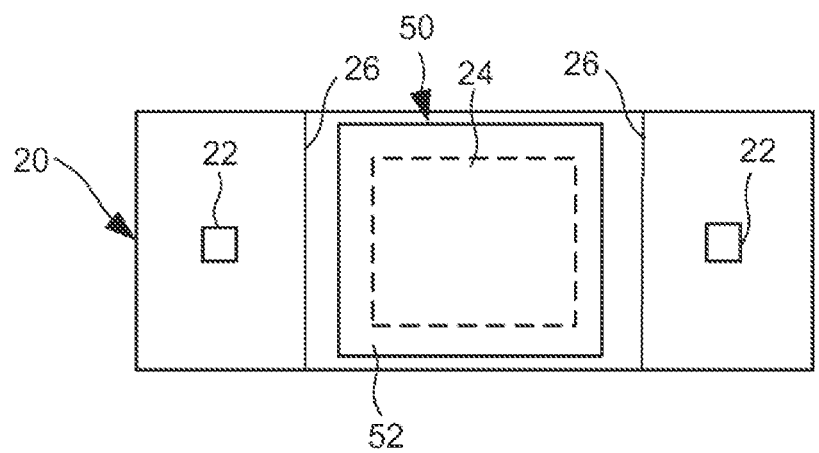
FIG. 6 shows a bottom view of the exemplary embodiment of the pulse sensor according to FIG. 3.

FIG. 6 shows a bottom view of the exemplary embodiment of the pulse sensor according to FIG. 3. It is apparent from FIG. 6 that the light sources 22 and the light detector 24 are each arranged in separate chambers of the pulse sensor 20, and the chambers are open at the bottom, so that the generated light can leave the pulse sensor 20 in the direction of the tissue 30, and the scattered light can reach the light detector 24.

Figure 7:
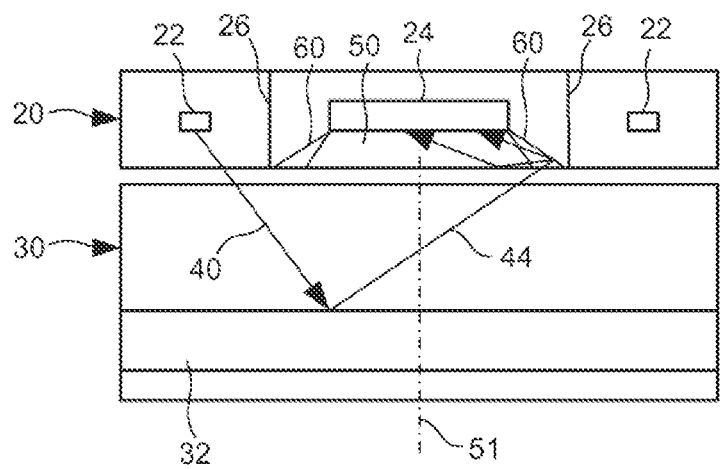
FIG. 7 shows a lateral sectional illustration of an exemplary embodiment of a pulse sensor on a tissue of a living being.

FIG. 7 shows a lateral sectional illustration of an exemplary embodiment of a pulse sensor 20 on a tissue 30 of a living being. The tissue 30 corresponds to the tissue 30 explained above and includes the blood vessel 32. The pulse sensor 20 substantially corresponds to the pulse sensor 20 explained above. In addition, the pulse sensor 20 includes at least one, preferably two or more diffusely reflecting surfaces 60.

The diffusely reflecting surfaces 60 are arranged outside the optical concentrator 50 in such a way that a distance between the diffusely reflecting surfaces 60 and the optical concentrator 50 is less close to the light detector 24 than far from the light detector 24. The diffusely reflecting surfaces 60 can extend, for example, from the lower sides of the partition walls 26 shown in FIG. 7 up to the lower side of the light detector 24. The light-sensitive surface of the light detector 24 is preferably located between the diffusely reflecting surfaces 60 in the horizontal direction in FIG. 7. An air gap or another material having a low index of refraction, thus having an index of refraction of approximately one or precisely one, is located between the optical concentrator 50 and the diffusely reflecting surfaces 60. The diffusely reflecting surfaces 60 can include, for example, plastic, $TiO_2$, $Al_2O_3$, and/or barium sulfate or can be formed therefrom.

The diffusely reflecting surfaces 60 act like an optical funnel which collects light which would not be incident on the light detector 24 without the reflecting surfaces 60, and reflects this light toward the optical concentrator 50, which then guides this light toward the light-sensitive surface of the light detector 24. For example, if the third light path 44 does not open into the optical concentrator 50, but extends toward one of the diffusely reflecting surfaces 60, the corresponding component of the light is thus reflected toward the optical concentrator 50. The optical concentrator 50 can then guide this component of the light directly or indirectly, for example by means of internal total reflection, to the light-sensitive surface of the light detector 24.

In addition, light which exits from the optical concentrator 50 via one of the side walls 56 of the optical concentrator 50 can be reflected back into the optical concentrator 50. This causes a larger component of the light scattered in the tissue 30 to reach the light detector 24 than without the diffusely reflecting surfaces 60. This contributes to the pulse sensor 20 having a particularly high efficiency.

In the exemplary embodiment explained with reference to FIG. 7, the diffusely reflecting surfaces 60 and the partition walls 26 are elements of the pulse sensor 20 separated from one another. In an alternative embodiment, the diffusely reflecting surfaces 60 can form the partition walls 26, wherein then separate partition walls 26 can be omitted.

Figure 8:
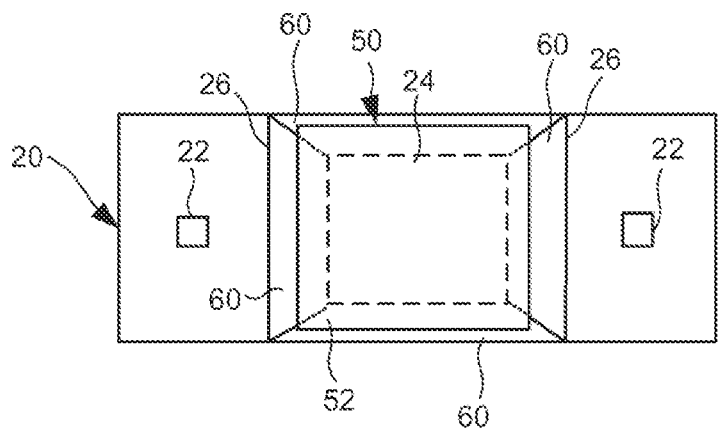
FIG. 8 shows a bottom view of an exemplary embodiment of the pulse sensor according to FIG. 7.

FIG. 8 shows a bottom view of an exemplary embodiment of a pulse sensor 20. The pulse sensor 20 can correspond, for example, to the pulse sensor 20 explained with reference to FIG. 7. It is apparent from FIG. 8 that the pulse sensor 20 includes four of the diffusely reflecting surfaces 60. The four diffusely reflecting surfaces 60 are arranged in FIG. 8 on the right, on the left, above, and below the light detector 24, respectively.

Figure 9:
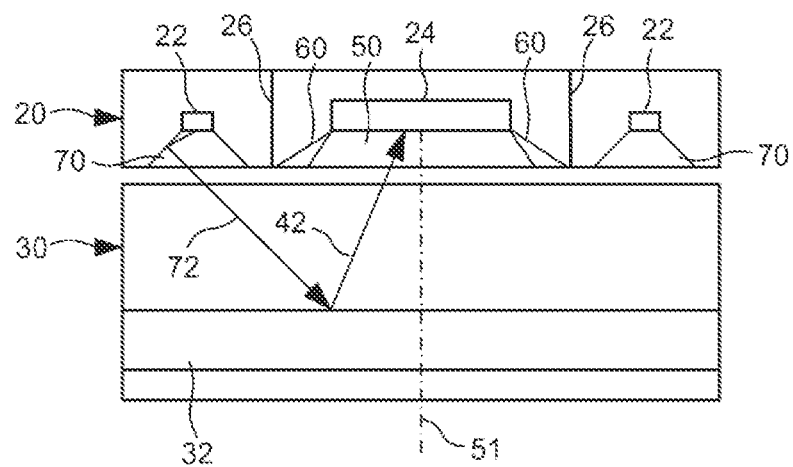
FIG. 9 shows a lateral sectional illustration of an exemplary embodiment of a pulse sensor on a tissue of a living being.

FIG. 9 shows a lateral sectional illustration of an exemplary embodiment of a pulse sensor 20 on a tissue 30 of a living being. The pulse sensor 20 can substantially correspond, for example, to the pulse sensor 20 explained with reference to FIG. 7. In addition, the pulse sensor 20 includes at least one, preferably multiple decoupling bodies 70, in particular precisely one decoupling body 70 for each of the light sources 22. The decoupling bodies 70 are arranged in the beam path between the corresponding light sources 22 and the tissue 30. The decoupling bodies 70 are transparent to the light generated by means of the light sources 22.

The decoupling bodies 70 each include a second entry surface, which faces toward the corresponding light source 22 and which is in optical contact with the corresponding light source 22. The second entry surfaces preferably correspond to the light-emitting surfaces of the light sources 22. For example, the second entry surfaces and the light-emitting surfaces of the light sources can each be approximately equal in size, preferably precisely equal in size.

The light generated by means of the light sources 22 is coupled via the corresponding second entry surfaces into the corresponding decoupling bodies 70. Within the decoupling bodies 70, the light is guided toward a second exit surface of the corresponding decoupling body 70 in each case and decoupled via the corresponding second exit surface toward the tissue 30. The light guiding inside the decoupling body 70 can take place at least partially via internal total reflection at the one or the multiple second side walls of the decoupling body 70. The second exit surfaces are larger than the corresponding second entry surfaces.

The decoupling bodies 70 can be made ingot-shaped, for example. Descriptively speaking, the decoupling body 70 can correspond with respect to its shape and the material used to the optical concentrator 50, wherein the decoupling body 70, in contrast to the optical concentrator 50, is arranged at the light sources 22 and not at the light detector 24. The decoupling body 70 can also accordingly be formed in one piece.

Furthermore, the decoupling body 70 can include at least one second side wall, which connects the second entry surface to the second exit surface. In addition to the second side wall, the decoupling body 70 can include one, two, or more second side walls. The second side wall can enclose an angle greater than zero with a normal on an emission surface of the light source. Outer surfaces of the second side walls can be optically smooth.

The decoupling bodies 70 can include the same materials or be formed from the same materials as the optical concentrator 50. The decoupling bodies 70 can include artificial resin, silicon, glass, and/or polycarbonate or can be formed therefrom. In addition, it is particularly advantageous if the material used has a high index of refraction. In particular upon the use of glass, it can therefore be advantageous to use glass which has a high index of refraction. In contrast, polycarbonate fundamentally has a very high index of refraction for a plastic.

The decoupling bodies 70 can be fastened, for example, by means of adhesive on the corresponding light sources 20. The adhesive is transparent to the generated light and has the same or a higher index of refraction than the corresponding decoupling body 70.

The second side walls of the decoupling body 70 adjoin air or another medium having a low index of refraction, for example, an index of refraction of approximately one or precisely one, so that the internal total reflection takes place at the second side walls. In other words, air or another medium having a low index of refraction is located between the decoupling bodies 70 and the partition walls 26 adjacent thereto.

The decoupling bodies 70 are used to guide light generated by means of the light sources 22, which would not be incident on the tissue without the decoupling bodies 70, toward the tissue, for example by means of internal total reflection. For example, light which propagates along a sixth light path 72 is first incident on an inner side of one of the second side walls of one of the decoupling bodies 70. This component of the generated light is then scattered by the blood vessel 32 or by the close surroundings of the blood vessel 32 and modulated at the same time, so that the modulated scattered light can then propagate along the second light path 42 toward the light-sensitive surface of the light detector 24.

Figure 10:
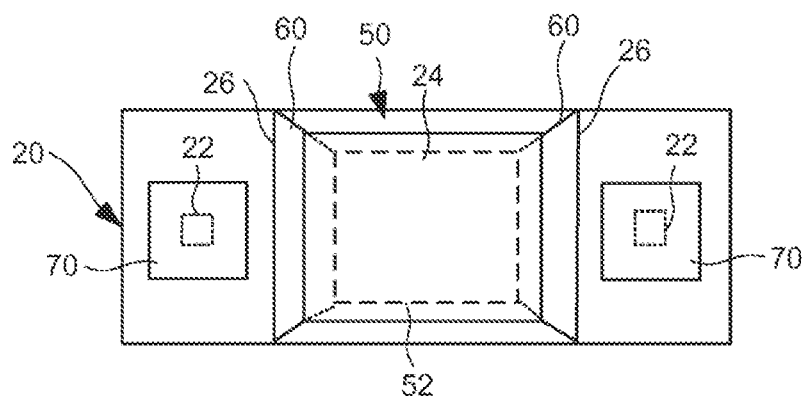
FIG. 10 shows a bottom view of an exemplary embodiment of the pulse sensor according to FIG. 9.

FIG. 10 shows a bottom view of an exemplary embodiment of the pulse sensor 20 according to FIG. 9. It is apparent from FIG. 10 that in this exemplary embodiment, four of the diffusely reflecting surfaces 60 are arranged. Alternatively thereto, however, the reflecting surfaces 60 can also be omitted, only one diffusely reflecting surface 60 or more than two, for example four diffusely reflecting surfaces 60 can be formed, as explained with reference to FIG. 8.

Figure 11:
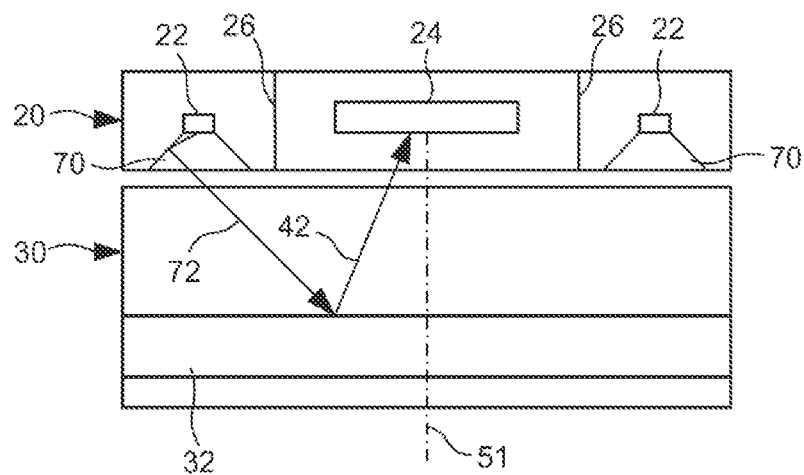
FIG. 11 shows a lateral sectional illustration of an exemplary embodiment of a pulse sensor on a tissue of a living being.

FIG. 11 shows a lateral sectional illustration of an exemplary embodiment of a pulse sensor 20 on a tissue 30 of a living being. The tissue 30 corresponds to the tissue 30 explained above. The pulse sensor 20 can, for example, substantially correspond to the pulse sensor 20 explained with reference to FIG. 10, wherein the optical concentrator 50 and the diffusely reflecting surfaces 60 were omitted. Therefore, this pulse sensor 20 only additionally has the decoupling body 70 in relation to the conventional pulse sensor 10.

The invention is not restricted to the specified exemplary embodiments. For example, the exemplary embodiments explained above can be combined with one another. For example, all of the exemplary embodiments shown can include one, two, or more of the diffusely reflecting surfaces 60. Furthermore, all exemplary embodiments shown can include only one light source 22 or more than two light sources 22 and/or corresponding decoupling bodies 70. Furthermore, all exemplary embodiments shown can include two or more light detectors 24 and/or corresponding optical concentrators 50. Furthermore, each of the explained pulse sensors 20 can include a control unit for activating the light sources 22 and/or for evaluating the output signal of the light detector 24. Alternatively thereto, the control unit can be arranged outside the pulse sensor 20.

The invention claimed is:

1. A pulse sensor comprising:
at least one light source configured to emit light in a direction of a blood-perfused tissue of a living being;
at least one light detector including a light-sensitive surface configured to sense at least a part of a light scattered by the blood-perfused tissue, wherein the scattered light is modulated depending on a pulse of the living being;
an optical concentrator arranged in a light path of the scattered light between the blood-perfused tissue and the light-sensitive surface, the optical concentrator configured to concentrate the scattered light; and
at least one diffusely reflecting surface configured to reflect the scattered light toward the optical concentrator, wherein the reflecting surface is arranged outside the optical concentrator,
wherein the optical concentrator has a first entry surface, through which the scattered light is able to enter the optical concentrator, and a first exit surface, through which the concentrated scattered light is able to exit from the optical concentrator toward the light-sensitive surface, the first exit surface being parallel to the first entry surface,
wherein the optical concentrator is transparent to the scattered light,
wherein the first entry surface is larger than the first exit surface and larger than the light-sensitive surface,
wherein the optical concentrator is in optical contact with the light detector via the first exit surface,
wherein the first entry surface is arranged at a top surface of the pulse sensor,
wherein a distance of the reflecting surface to the optical concentrator close to the light detector is less than a distance of the reflecting surface to the optical concentrator far from the light detector, and
wherein the reflecting surface far from the light detector is arranged at the top surface of the pulse sensor.

2. The pulse sensor as claimed in claim 1, wherein the optical concentrator is formed in one piece.

3. The pulse sensor as claimed in claim 1, wherein the optical concentrator includes at least one first side wall connecting the first entry surface to the first exit surface.

4. The pulse sensor as claimed in claim 3, wherein the first side wall encloses an angle greater than zero with a normal on a detector surface of the light detector.

5. The pulse sensor as claimed in claim 3, wherein an outer surface of the first side wall is optically smooth.

6. The pulse sensor as claimed in claim 1, wherein an outside of the first entry surface is antireflective.

7. The pulse sensor as claimed in claim 1, wherein the optical concentrator comprises artificial resin, silicon, and/or glass or is formed therefrom.

8. The pulse sensor as claimed in claim 1, wherein an index of retraction between the diffusely reflecting surface and the optical concentrator is precisely one.

9. The pulse sensor as claimed in claim 8, wherein the diffusely reflecting surface includes plastic, $TiO_2$, $Al_2O_3$, and/or barium sulfate or is formed therefrom.

10. The pulse sensor as claimed in claim 1, wherein the optical concentrator comprises polycarbonate or is formed therefrom.

11. The pulse sensor as claimed in claim 1,
wherein the first exit surface is directly connected to the light-sensitive surface via an adhesive, and
wherein the optical concentrator, in a cross-sectional view, is shaped as a trapezoid so that the first exit surface has the same size as the light-sensitive surface.

12. The pulse sensor as claimed in claim 11, wherein the adhesive is transparent to the scattered light and has the same or a higher index of refraction than the optical concentrator.

13. A pulse sensor comprising:
at least one light source configured to emit light in a direction of a blood-perfused tissue of a living being;
at least one light detector including a light-sensitive surface configured to sense at least a part of a light scattered by the blood-perfused tissue, wherein the scattered light is modulated depending on a pulse of the living being;
an optical concentrator arranged in a light path of the scattered light between the blood-perfused tissue and the light-sensitive surface, the optical concentrator configured to concentrate the scattered light; and
at least one diffusely reflecting surface configured to reflect the scattered light toward the optical concentrator,
wherein the optical concentrator has a first entry surface, through which the scattered light is able to enter the optical concentrator, and a first exit surface, through which the concentrated scattered light is able to exit from the optical concentrator toward the light-sensitive surface, the first exit surface being parallel to the first entry surface,
wherein the optical concentrator is transparent to the scattered light,
wherein the first entry surface is larger than the first exit surface and larger than the light-sensitive surface,
wherein the optical concentrator is in optical contact with the light detector via the first exit surface,
wherein the first entry surface is arranged at a top surface of the pulse sensor,
wherein the reflecting surface is spaced apart at least partially from the optical concentrator,
wherein the reflecting surface laterally surrounds the optical concentrator from the top surface of the pulse sensor to the light-sensitive surface of the light detector.

14. A pulse sensor comprising:
at least one light source configured to emit light in a direction of a blood-perfused tissue of a living being;
at least one light detector including a light-sensitive surface configured to sense at least a part of a light scattered by the blood-perfused tissue, wherein the scattered light is modulated depending on a pulse of the living being;

an optical concentrator arranged in a light path of the scattered light between the blood-perfused tissue and the light-sensitive surface, the optical concentrator configured to concentrate the scattered light; and at least one diffusely reflecting surface configured to reflect the scattered light toward the optical concentrator, wherein the optical concentrator has a first entry surface, through which the scattered light is able to enter the optical concentrator, and a first exit surface, through which the concentrated scattered light is able to exit from the optical concentrator toward the light-sensitive surface, the first exit surface being parallel to the first entry surface, wherein the optical concentrator is transparent to the scattered light, wherein the first entry surface is larger than the first exit surface and larger than the light-sensitive surface, wherein the optical concentrator is in optical contact with the light detector via the first exit surface, wherein the first entry surface is arranged at a top surface of the pulse sensor, and wherein the reflecting surface is directly connected to the optical concentrator at one end and spaced from the optical concentrator at another end.

* * * * *